Jan. 31, 1961

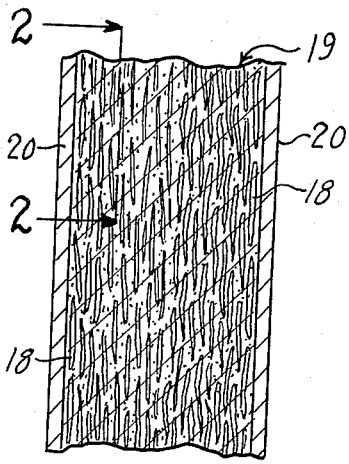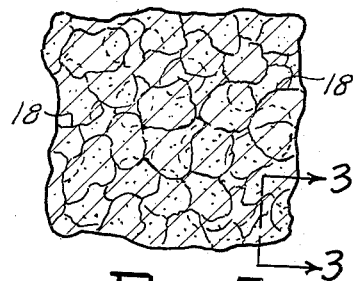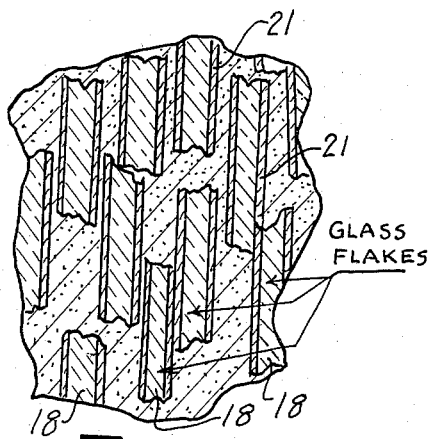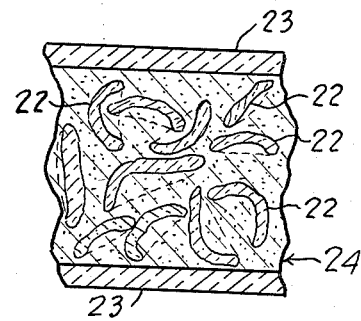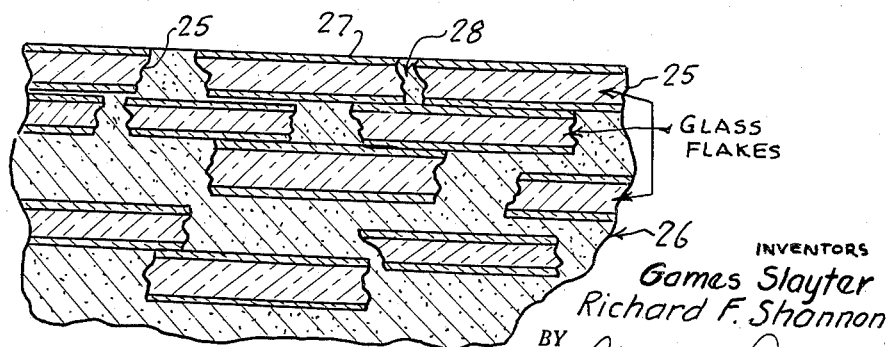

G. SLAYTER ET AL 2,970,127

GLASS REINFORCED GYPSUM COMPOSITION
AND PROCESS OF PREPARATION

Filed Dec. 28, 1954

INVENTORS
Garnes Slayter
Richard F. Shannon
BY
ATTORNEYS

United States Patent Office 2,970,127
Patented Jan. 31, 1961

2,970,127
GLASS REINFORCED GYPSUM COMPOSITION AND PROCESS OF PREPARATION

Games Slayter, Newark, and Richard F. Shannon, Lancaster, Ohio, assignors to Owens-Corning Fiberglas Corporation, a corporation of Delaware Filed Dec. 28, 1954, Ser. No. 477,985

6 Claims. (Cl. 260—38)

This invention relates to reinforced plastic compositions and to materials made therefrom and, more particularly, to cementitious materials such as gypsum and other plasters and to the reinforcement of such materials with glass, specifically in the form of flakes, films, chips or platelets.

Slayter Patent No. 2,457,785 discloses an apparatus for making a glass film. This apparatus comprises an annular orifice on the bottom of a molten glass supply tank through which a circular sheet or tube of molten glass flows. As the tube of glass strikes the atmosphere it cools sufficiently to become plastic rather than molten and the tube is grasped between the peripheries of a pair of feeding drums and fed downwardly in the form of a flattened tube. Air under pressure is introduced into the tubular section above the pulling rollers both to cool the glass and to form it outwardly into a balloon-like configuration to prevent opposite sides of the glass from adhering and to prevent the surface tension of the glass from shrinking the tube into a single stream.

The film glass thus made may be broken into flakes or platelets in many ways as by simply being shattered, and it may be pulled at relatively high speeds to such a degree that the thickness of the film, and thus of the platelets or flakes of glass, is in the order of 8 microns or less. The physical and electrical properties of this material are excellent. The glass flakes have a tensile strength in the order of 200,000 p.s.i.; their Young's modulus is in the order of $11 \times 10^5$ p.s.i.; their di-electric strength is in the order of 800 volts/mil.

It is the principal object of this invention to provide methods, apparatus and processes for the incorporation of glass flakes having such characteristics into and with bodies of cementitious material particularly of the gypsum and other plaster types in order to impart improved qualities to the cementitious masses, and to provide improved articles and casts made therefrom.

While it has been suggested in the past that glass fibers be incorporated into cementitious masses, many difficulties resulting from the physical nature of the fibers, have rendered the incorporation not only difficult but the results relatively limited. It has been, for example, almost impossible to load plaster or gypsum with more than, say, 1 or 2% by weight of textile glass fibers because of the difficulties in compacting the fibers due to the many interstices between the filaments of the fibers. Croce and Shuttleworth Patent No. 2,681,863 discloses the process of incorporating textile glass fibers into gypsum plaster casts through the medium of introducing the fibers in the form of short sections of strands made up of a large number of glass filaments. Even under these conditions, approximately 1% by weight is the maximum quantity of glass which can be successfully combined according to their disclosure.

It is, therefore, a further object of this invention to provide methods and means for the incorporation of much higher percentages by weight of glass into gypsum and other plaster-like materials so that a far greater percentile advantage of the strength and other characteristics of the glass can be utilized in the finished composition.

It has been discovered that through the practice of the instant invention glass percentages by weight of as high as 50% to 70% or more of the weight of the finished composition can be successfully dispersed in and bonded to a cementitious matrix for the fabrication of construction materials, molds, patterns, and other bodies and structures.

In the drawings:

Fig. 1 is a frequency vertical sectional view on an enlarged scale, transversely through a building board of the type commonly called "plasterboard" wherein a sheet-like mass of gypsum material having its major faces protected by paper sheets is intended for building up interior partition walls.

Fig. 2 is a fragmentary vertical sectional view taken along the line 2—2 of Fig. 1 and illustrating the manner in which the glass flakes are dispersed in the plaster matrix according to the invention.

Fig. 3 is a further enlarged, fragmentary, detailed sectional view taken along the line 3—3 of Fig. 2 and illustrating in general how the glass flakes are bonded into the plaster matrix and heterogeneously arranged with respect to each other for greatly improved strength of the plaster body.

Fig. 4 is a view similar to Fig. 1 but illustrating the reinforcement and bulking of a plaster mass with curved flakes of glass and also showing how a plaster board mass may be further strengthened and given additional desirable properties by the lamination therewith of a thin film or sheet of glass according to the invention.

Fig. 5 is a view also similar to Figs. 3 and 4 but illustrating how, by proper distribution of the glass flakes throughout the body of a plaster mass, an almost impervious layer of glass flakes may be created within the mass at a major face.

To simplify the description and explanation of the methods and processes embodying the invention for the production of new materials from the new compositions of the invention, the specification will be divided into several sections having to do with the various phases of the problems encountered and their solutions.

Assuming the existence of a sufficient quantity of small glass flakes produced, for example, by the process and on the apparatus disclosed in the mentioned Slayter patent, the first problem encountered in utilizing such flakes for the reinforcement of any material or substance is the tendency of those flakes to adhere to each other because of their clean, flat surfaces and the resulting interfacial adhesion of one flake of glass to the other. This problem of adhesion is, of course encountered in the utilization of flat glass flakes. It is eliminated in the utilization of the curly glass flakes of Fig. 4 and certain advantages thus accrue from the curly flakes as will be explained below.

In general, adhesion of the flakes to each other and the tendency of the flakes to form masses of flakes creates a problem physical in nature when the flakes are to be adequately dispersed through the mass of composition to be reinforced, for example, the slurry of gypsum or other plasters. Attempts have been made to admix the glass flakes to the gypsum or plaster by the utilization of mechanical mixing means. Some disadvantages result from attempts to use high speed stirring means of the beater or propellor types because of the mechanical shattering of the glass flakes caused by the mechanical stirring implement. It is more desirable, therefore, to employ mixing means which have a kneading action or means which interfold the slurry and the glass flakes. In this connection it is sometimes desirable to add a wetting agent, particularly one containing a fatty ester or a fatty acid, since this material not only lubricates the surfaces of the glass flakes or platelets and causes the plaster slurry to wet the flakes, but it also tends to retard the setting time of the plaster thus giving a longer working life to the admixture and permitting a more thorough dispersion to be made at a slower, less damaging speed.

The addition of such a wetting agent accomplishes a number of results. It not only provides for the wetting of the flakes, the lubrication of the flakes, and the retardation of the setting time, but it may function to couple the flakes to the gypsum itself through the medium of a chemical bond the mechanism of which will be described below.

Figure 6:
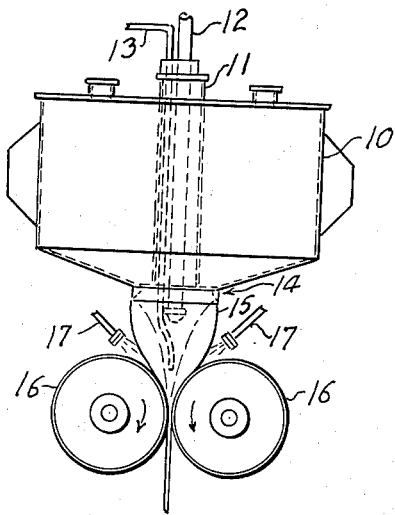
Fig. 6 is a view of apparatus such as that disclosed in Slayter Patent 2,457,785 modified to permit the addition of various agents to the surfaces of the glass film as it is formed; the substances including lubricants, bonding or coupling agents, dispersing agents, materials for flake lamination and other materials, the nature and function of which will be explained in the specification.

Wetting agents, like other agents employed for different purposes according to the invention, may be added to the flake glass as it is made, as shown in Fig. 6 where apparatus is shown for forming the flake glass and at the same time adding a coating or surface active agent or medium on the glass. In this apparatus a glass melter 10 maintains a pool of molten glass as a supply. The melter 10 is vertically cored and through its core extends a tube 11 containing two or more pipes 12 and 13. At the bottom of the melter 10 and more or less concentric with the tube 11 there is an annular orifice generally indicated at 14 so designed as to permit the flow of a relatively thin-walled glass tube 15 downwardly. Compressed air or other fluid or vapor is introduced through the pipe 12 into the interior of the glass tube 15 to form a bubble or balloon-like contour of the glass. The glass tube then is collapsed and led between the peripheries of a pair of attenuating rollers 16 which are driven in the direction of the arrows to apply tractive force to the cooling glass tube for attenuating the film from the flowing stream and feeding the film downwardly. The vapor or fluid introduced through the pipe 12 is under sufficient pressure that it "balloons" the tube 15 preventing its opposite walls from collapsing and preventing surface tension from pulling them inwardly into a single stream.

The tube 13 extends downwardly through the tube 11 to a point just above the nip of the rollers 16 for the introduction of any desired liquid, powdered, vaprous, or other agent, coating substance, etc. Similarly, a pair of sprays or spreaders 17 may be located to spray, drop or otherwise spread a similar substance on the outer surfaces of the flattened tube of glass 15 just as it enters the rollers 16.

Where a composition of gypsum plaster containing and reinforced with flake glass is the product desired according to the invention, the introduction of a wetting agent through the pipe 13 and by means of the sprays or spreaders 17 provides for better wetting of the glass flake surfaces by the gypsum slurry. Lubrication of the glass flakes permits better and more uniform mechanical dispersion of the flakes throughout the mass of plaster by eliminating the interfacial adhesion of the flakes.

After the glass flakes are formed and provided with such an agent, either during the manufacturing process above described, or later, it is desirable to compound the mass of material by mixing all of the other plaster ingredients thoroughly and then adding the glass flake in the desired amount to the mixture at as late a time as possible to permit thorough dispersion but reducing the mechanical damage to the glass to the minimum. Addition of the desired surface active agent for the glass can be made to the plaster ingredients before, with, or after introduction of the flakes. By suitably mixing or kneading in the glass flakes a thick water slurry of the glass flakes and gypsum results. This may be poured, spread, or otherwise distributed in the desired manner and allowed to set up by the hydrolyzation of the gypsum.

After such a plaster mass has set up, its cross sectional configuration is generally in the form illustrated in Fig. 1 where the glass flakes 18, by reason of their being flat, are distributed throughout the mass in relatively uniform relationship but in random dispersion with their major faces substantially parallel to each other. If the gypsum or other plaster product being fabricated is a building board, these flakes lie with their faces parallel to the major faces of the building board thus increasing the tensile strength of the board in two directions and imparting to it increased impact and shear strength as well as higher dielectric strength, and greater water and heat resistance.

The reinforcement of gypsum or similar plastic masses with plate-like material such as mica, is known in the art, but mica possesses two disadvantages when considered in contrast to the glass flake reinforcement proposed by the instant invention. In the first place, mica particles continue to cleave and a final flake of mica is almost impossible to achieve, it being theorized that the mica would continue to cleave until it reached an ultimate thickness of 1 molecule. In sharp contrast, a flake or platelet of glass is an amorphous material, its thickness may be controlled with nicety, and once fabricated it has no possibility of further cleavage. There are further no intraflake lines of incipient separation or cleavage. There being no cleavage planes in the glass flakes the reinforced plaster is stronger because it exhibits no tendency to foil within the flakes as in the case of mica. It will be appreciated that the bond between the plaster and the reinforcing material can remain intact in a mica reinforced mass, but failure can occur by reason of a cleavage of the mica platelets.

Secondly, unlike glass, mica includes water of crystallization and under many conditions, particularly heat, this water of crystallization is liberated. The liberation of water of crystallization may have highly disastrous results and the degree of liberation of the combined water is very difficult to control. In sharp contrast, glass flakes contain no combined water and no problem of its sudden and unexpected liberation is, therefore, encountered.

In the illustration of Fig. 1 the flakes or platelets 18 are arranged parallel to each other and dispersed throughout the generally sheet-like mass of gypsum indicated by the reference number 19 and the surfaces of the sheet are protected by conventional sheets of paper 20. As can be seen in Fig. 2, each of the flakes 18, by its random disposition, overlies and extends between numbers of other flakes. By suitably bonding the flakes 18 to the gypsum 19 according to the invention, as explained below, the high tensile strength of the glass flakes is made available to the mass as a whole and, as well, the great resistance of the class flakes to the passage of moisture, vapor or electrical charges is provided by the extensive overlapping of the flakes. The only path which vapor or electrical discharge could take through a composition made according to the invention would be a tortuous path leading around and back and forth between literally thousands of fine glass flakes. Such a tortuous path affords substantially complete resistance to the passage of moisture, vapor and greatly increases the ability of the composition to resist electrical arcing.

It will be observed in Fig. 3 that each of the flakes 18 is shown as carrying a coat of lubricant or other surface treating agent, indicated at 21, on each of its faces. The material is, of course, present in an extremely thin film and in many instances the films of material may be in contact, one with the other. It is thus desirable in some cases to employ a material having, in addition to its primary purposes, the quality of promoting coupling between the glass platelets as well as between the glass and the gypsum. Such lubricants or coupling agents and their utilization will be described below.

By so modifying the operation of the apparatus of Fig. 6 that the strains and stresses on the tube of glass 15 do not remain uniform around the balloon as it flows downwardly from the orifice 14 to the pulling rollers 16, or by causing irregularities in the thickness or other characteristics of the glass before the flakes are formed, internal stresses, or other laterally acting forces may be created. Thus, upon shattering of the film formed, it breaks, not into the flat flakes as shown in Figs. 1, 2 and 3, but into generally cup-shaped flakes 22. Such cup-shaped flakes or fragments have advantages and disadvantages for different end uses of the compositions being formed. Where it is desirable to introduce a substantial bulk factor into a mass of gypsum or similar plaster material, cup-like flakes 22 may be employed in lieu of other aggregate such as sand, or expanded mica. Additionally, by reason of the three dimensional or non-planar configuration of the cup-like fragments or flakes 22 the mass of gypsum in which they are present is strengthened in all three directions. During the dispersion of the flakes 22 in the slurry, their shapes cause them to disperse in random positions much like those indicated in Fig. 4 rather than lying parallel to each other as indicated in Figs. 1–3.

While the dispersion of the glass flakes in gypsum and similar slurries so far described has contemplated the mechanical admixture of the flakes to the slurry, preferably as the last ingredient added and preferably in company with or pre-coated with dispersing, lubricating or coupling agents, other manners of dispersion of the flakes with the cementitious material may be employed. For example, the flakes of glass, either in the flat form like the flakes 18 or the curly form like the flakes 22, may be dispersed with the gypsum by co-deposition, i.e., powdered gypsum and flakes may both be thrown or discharged into a container simultaneously with other ingredients and at controlled rates so that the gypsum and flakes are interdispersed one with the other. The materials may be mixed by air tumbling, i.e., both of them may be blown upwardly into an enclosure and recirculated within the enclosure by air currents so as to intermix the two. The admixture of glass flakes and gypsum slurry may also include a foaming agent, as commonly used in the preparation of gypsum plasters so that the foaming action within the slurry disperses and orients the platelets with respect to the interstices caused by the foaming agent.

In this connection it should be observed that ordinarily a foamed gypsum or other cementitious material, while having, of course, a substantially lower specific gravity, i.e., a greater volume for the same weight, is proportionately weaker than the solid mass prior to foaming. By controllably adding glass flakes to the admixture according to the inventon, all of the strength lost by the foaming operation is restored to the foamed gypsum mass and its structural and other strengths, even though it is foamed, are considerably higher than the structural and other strengths of the gypsum or cementitious material before it is foamed. It is thus possible to build relatively large blocks of foamed gypsum and cementitious material reinforced with glass flakes according to the invention which have considerable strength. Such blocks may be constructed in the sizes and shapes normally employed, for example, in making partition walls where the moisture, vapor resistance and heat transmission characteristics of the mass contribute to the desirability of the finished partition.

Fig. 4 also illustrates the application of two sheets or films of glass 23 on the exterior face of the mass of gypsum generally indicated at 24 which is reinforced or bulked by the curly flakes 22. While the sheets or films 23 of the glass are shown in Fig. 4 in use in combination with the curly flakes 22, the desirability of employment of surface films of glass on gypsum masses is not limited to those reinforced by curly flakes or even to those reinforced by flat, parallel flakes according to the same invention. The same principles of adhesion between the gypsum or plaster mass and the glass flakes are employed for the provision of adequate adhesion or coupling between the film or sheets 23 and the mass of gypsum. These problems will be discussed below.

Because of the imperviousness of a relatively thin glass film to the passage of vapor, the addition of the film 23 to a gypsum board provides a complete vapor barrier so that construction work employing such boards need not be further supplied with a vapor barrier in the form of a sheet of aluminum foil, plastic film, or coating of asphalt or other vapor-proof material.

Fig. 5 illustrates a manner of achieving a virtually impermeable skin film of glass flakes near or at the surface of a mass of gypsum or cementitious material to provide a vapor barrier without the employment of the more difficultly handled sheets or films 23. In Fig. 5 a plurality of flat glass flakes 25 are shown tightly compacted one against the other and in close lateral adjacency near the upper surface of a fragment of gypsum generally indicated at 26. Each of the flakes 25 is illustrated as being coated with one of various types of agents hereinafter described, the coatings being indicated at 27 and, in Fig. 5, portions of the coating which may fill the interstices between the flakes being indicated at 28. By selecting a suitable one of the many agents which may be employed as coupling, lubricating or dispersing agents for the glass flakes, it is possible to compact the flakes at the surfaces of the gypsum mass and to provide a tough, strong, almost impermeable surface for the mass. As an example, sufficient phenolic resin may be added to the glass flake during its original formation, as, by being fed downwardly through the tube 13 to the interior of the balloon and sprayed upon the exterior from the spray heads 17, so that it will flow over and coat each of the individual glass flakes 25 filling in and leveling up the surface of the composition and setting up to form a resin and glass skin on the surface of the mass of gypsum, see Figures 5 and 6. In addition to forming a surface on the mass, the resinous material functions also to couple the glass to the gypsum and thus increases the strength and other properties of the mass throughout.

Figure 8:
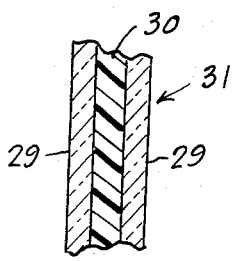
Fig. 8 is a fragmentary vertical sectional view on a greatly enlarged scale of a single laminated glass flake, the laminating material being generally indicated as synthetic and resinous but the showing in the drawing not being intended to limit the nature of such material.

As was explained above, numerous substances may be added to the interior of the tube of glass 15 by being fed down through the tube 13 and deposited at the nip of the rollers 16. In addition to the lubricating, dispersing and coupling agents briefly discussed above, under some circumstances it may be desirable to introduce a cement or adhesive material between the walls of the collapsed tube of film glass for serving two functions. In the first place, the introduction of a suitable material for the adhesion of two flakes together as illustrated in Fig. 8, where a flake 29 is shown as being adhered to a second flake 29 by an interior layer 30, results in there being only two major glass surfaces which must be coated with one of the aforementioned agents to accomplish the results described above. Additionally, each of the laminated flakes as generally shown in Fig. 8 by the reference number 31, is stronger structurally than two separate flakes 29 since each flake 29 is bonded to the other and the strength of the bonding material 30 adds to the strength of the flakes. The strength being spoken of in this instance is that which would resist shattering, for example, during a mechanical mixing operation.

A second considerable advantage results from a laminated flake such as the flake 31, since by proper selection of the laminating material the specific gravity of the flake 31 can be made approximately equal to the specific gravity of the particular gypsum or plaster mass in which it is to be dispersed. If the specific gravity of the flakes and the mass are substantially identical, the tendency of the flakes to drift either to the upper or lower portions of the mass by reason of differences in their specific gravities is virtually overcome and upon thorough mechanical admixing the flakes are dispersed more uniformly throughout the mass of gypsum.

Figure 9:
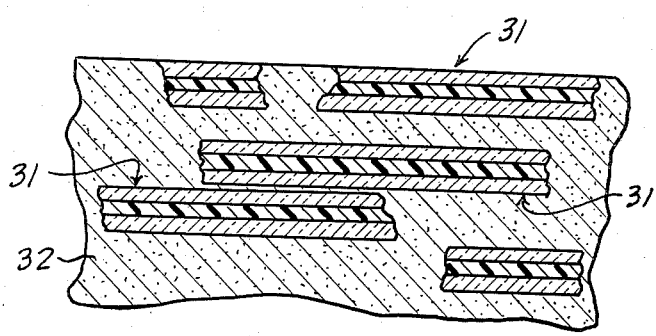
Fig. 9 is a view similar to Figs. 3 and 5 but illustrating a cementitious or plaster mass reinforced or bulked by the utilization of the laminated glass flakes of Fig. 8.

Fig. 9 illustrates a mass of gypsum 32 as reinforced by a relatively small proportion by weight of laminated flakes 31. In this combination the separate flakes 29 are bonded to each other to form the laminated flakes 31 and these are, in turn, bonded to the gypsum mass by the techniques and mechanisms to be discussed below.

Figure 7:
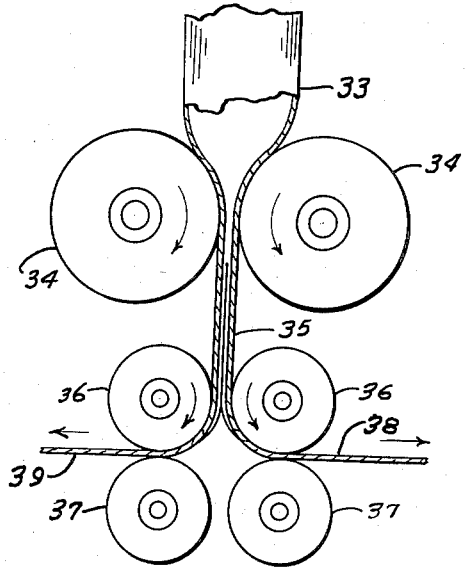
Fig. 7 is a fragmentary view of a modified form of apparatus designed to produce glass film and flakes and to treat the same according to the processes of the invention.

The apparatus illustrated in Fig. 7 is a modification of the apparatus of Fig. 6 wherein a balloon or tube of thin sheet glass 33 is led between a pair of attenuating rollers 34, which, in this case, are spaced upon parallel axes at such a distance that their peripheries do not squeeze the opposing faces of the balloon together but form it into a flattened glass envelope 35. By properly spacing the two rollers 34 both from each other and at a distance below the orifice through which the balloon 33 is formed, the condition of the glass when it reaches the attenuating rollers 34 is such that upon its collapse to form the envelope 35, a marginal crack forms at each side of the envelope 35. This splits the envelope 35, forming two strips or sheets 38 and 39 which are further fed by opposed pairs of feeding rollers 36 and 37, for example.

Because the envelope splits to allow the sheets 38 and 39 to be led away separately, it no longer is proper to consider the balloon 33 as being actually stretched laterally by air or fluid pressure in its interior since such air or vapor would escape downwardly between the sides of the flat envelope 35. Because the sheets 38 and 39 are separated, there is less tendency for the balloon to collapse. Surface treating materials may still be introduced into the interior of the balloon, however, by spraying onto its walls and, if air or other fluid is pumped thereinto, the escaping fluid insures non-contact between the sheets 38 and 39 in the nip between the rollers 34 and between the rollers 36.

Each of the sheets or films of glass 38 and 39 may then be separately handled. The sheet may be maintained in sheet-like form as for the purpose of forming the outside film 23 of the mass shown in Fig. 4, and it may also be led through suitable tanks or beneath or above suitable sprays or other spreading equipment for the application to its surfaces of selected ones of the various dispersing, lubricating, coupling or other agents with which it is to be coated. As in the apparatus of Fig. 6, in the case of the modified apparatus of Fig. 7, suitable spray heads may be located both in the interior of the balloon 33 and near the rollers 34, 36 and 37, for example, for applying surface treatment materials to the films 38 and 39.

While the foregoing discussion has touched relatively briefly upon the different types of lubricating, dispersing and coupling agents or substances which may be employed, their purposes and their mode of application, the actual nature of such substances and the particular properties which may accrue from their usage will now be discussed in the following sections of this specification under headings denominating in particular the types of substances employed.

It is to be understood that those substances described below and the theories which account for their properties in combination with glass or gypsum or other plaster masses are explanatory and exemplary in nature and are not intended to constitute limitations upon the subject matter of the instant invention.

WETTING AGENTS

It has been found that the addition to a gypsum slurry of any water-soluble or water dispersable wetting agent facilitates the formation therein of a uniform dispersion of glass flakes, and gives a longer working life before setting of the gypsum. Substantially improved results can be achieved with soaps, as well as with various synthetic wetting agents such as the alkyl sulfates, alkyl sulfonates, the alkyl-aryl polyether alcohols, the polyalkylene oxides and oxide condensates such as the esters and ethers, and also with other dispersing or wetting agents, some of which are known only by their trade names. It has been found to be universally true that any water soluble or water dispersable wetting or dispersing agent, regardless of chemical composition, is beneficial. Particularly advantageous results have been achieved using water soluble polyethylene-propyleneoxide wetting agents and condensates thereof, such as esters and ethers. In addition, various wetting agents, particularly sulfates and sulfonates, have been found to be couplers, as is hereinafter discussed in more detail.

The use of a wetting agent to improve a dispersion of glass flakes in a gypsum slurry is further advantageous because it makes possible the incorporation therein of oils or fatty acids to increase the water resistance of the ultimate product.

COUPLING AGENTS

Coupling agents can be used to form a chemical bond between glass flakes and gypsum. Oxygen linkage is an example of one type of chemical bond that can be utilized for such coupling. Such a linkage between a glass flake and gypsum, where aluminum chloride is the starting material used to effect such coupling, will now be discussed in detail for the purpose of further illustrating the oxygen linkage type of coupling. Such detailed discussion is in no way to be considered a limitation on the invention.

It has been found that aluminum chloride will react with glass. Such reaction is believed to involve one to three molecules of such a base as sodium hydroxide, and one chlorine from the aluminum chloride molecule per molecule of sodium hydroxide, and to form sodium chloride and aluminum hydroxide or an aluminum hydroxy chloride. The aluminum hydroxide or aluminum hydroxy chloride formed then reacts with another hydroxyl group, which can also be from a sodium hydroxide molecule in the glass, chemically binding the aluminum compound thereto, and forming water as a byproduct.

A gypsum slurry also contains free hydroxides, which may be sodium hydroxide, calcium hydroxide, or others. Thus, when glass flakes which have been reacted with an aluminum chloride solution as above discussed are admixed with the gypsum slurry, reaction occurs between the gypsum and the treated glass. The treated glass platelets can be represented by one of the following formulas, depending upon the extent of reaction.

*Formula I*

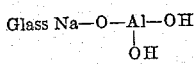

*Formula II*

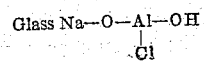

Formula III

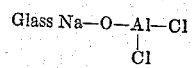

A platelet of the type represented by Formula I, above, will react directly with, for example, sodium hydroxide or calcium hydroxide in the gypsum in the same manner described above, forming an oxygen link between the aluminum and the gypsum, to produce a chemical bond between the gypsum and the glass, again giving off water. A treated platelet of the type represented by Formula II or III above, is capable of reaction with a base in the gypsum to form a chloride, thereby reducing the alkalinity of the gypsum, and replacing the chlorine attached to the aluminum with hydroxyl, which is then available for linkage, as described, with the gypsum. An aluminum chloride-treated glass flake represented by either Formula II or Formula III is capable of forming a chemical linkage with gypsum which can be represented by either of the following formulas:

Formula IV

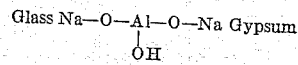

Formula V

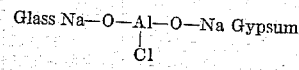

Aluminum chloride, as is discussed above, is an effective coupling agent. In addition, various other materials, both organic and inorganic, for example, tin chlorides, preferably stannous chloride, methacrylato-chromic chloride, various silicones and silanes can be used as couplers. The coupling reaction with tin chlorides and methacrylato-chromic chloride is similar to that described above in detail for aluminum chloride.

A metal, for example aluminum or lead, can also be bonded to the surfaces of the glass sheets 38 and 39 (Fig. 7) by thermal diffusion, and the exposed metal surfaces reacted to form a compound such as a chloride or an oxide which will couple with the gypsum, as described. If the metal layer is thin it may be converted throughout its thickness with the result that such chemical linkages are formed between it and the glass, as well as with the gypsum.

Silicones are known to adhere tightly to glass, in part because of their chemical similarity, being made up of long Si—O—Si—O—chains and probably also because of actual chemical reaction with the glass. It will be noted that the coupling mechanism described above between aluminum chloride and a glass flake, and also between aluminum chloride and gypsum, is similar to the well known hydrolysis of halosilanes and alkoxysilanes to the corresponding silanols and the condensation of the silanols to silicones, except that the silane hydrolysis is uusally accomplished by means of water, while the aluminum chloride hydrolysis discussed occurs by virtue of reaction with a base such as sodium hydroxide or calcium hydroxide. Silicones are believed to have some reactive groups in their molecules which react with bases in both a glass flake and in gypsum, and such reaction is believed to be responsible for the coupling achievable by silicones. If such reactive group is a hydroxyl which has not reacted during the condensation, water is produced as a byproduct, while if such reactive group is alkoxy or halo, an alcohol or alcoholate or halogen acid or salt thereof is produced as a byproduct.

A similar reaction is believed to be responsible for coupling by a silane between a glass flake and gypsum. Such reaction involves the formation of a salt, for example sodium chloride or calcium chloride and a silanol by reaction between a halosilane and a base in either the glass flake or gypsum, and then condensation between the silanol and a base in the glass flake or gypsum to produce the coupling. Vinyl silanes, being relatively non-oily, have been found to be most satisfactory for this type of coupling reaction.

As is mentioned above, various wetting agents are also couplers. In general, such wetting agents are materials which have an active group, usually a hydroxyl group, which is capable of reaction with a base. Examples of such wetting agents that are commercially available include alkyl sulfates and alkyl sulfonates, ordinarily sold as the sodium salts. Such materials can be chemically bonded to glass and gypsum in the manner described, and a secondary linkage achieved through the lipophilic tails chemically bonded to each.

BUFFERING

It is known that glass is deteriorated when subjected over an extended period of time to contact with highly alkaline materials. Such deterioration may possibly be due to rupture of bonds between separate silicic acid molecules in the glass structure. In any event, such deterioration does not occur when glass flake is used to reinforce gypsum having a pH lower than about 10, but is known to take place when the flake is in contact with some grades of commercially available gypsum having a pH as high as about 11.

It will be noted that the first step of the mechanism discussed above for coupling gypsum to glass flages, using aluminum chloride, involves the neutralization of alkalies and the formation therefrom of chloride salts. Such reaction serves a double function when it is desired to use glass flakes to reinforce gypsum in the higher pH range, i.e., higher than about 10. Hydrolysis of the aluminum chloride previously bonded to the glass surface neutralizes excess alkalinity in the gypsum, and at the interface where such excess alkalinity would otherwise cause glass deterioration. It has been found that alkali attack on the glass flakes by gypsum of high pH can be prevented in this manner. In addition to aluminum chloride, which, as described, also serves as a coupler, boric acid, ion exchange resins, and metallic salts other than aluminum chloride, and in general all metallic salts, can similarly be used for buffering. A preferred class of metal salts to be used as buffers includes those which, when dissolved in water, produce an acid solution. Most desirably, a buffer is a salt of aluminum, barium, titanium, copper, lead, zinc, zirconium or iron. Optimum results with soda lime glass have been achieved by using a barium salt as a buffer, while optimum results with a glass containing about 60 percent of $SiO_2$, 16 percent of CaO, 11 percent of $Na_2O$, and small amounts of MgO, $Al_2O_3$ and $B_2O_3$ have been achieved using salts of copper, aluminum, titanium, zinc and iron.

Either a buffer or a coupling agent can be applied to glass flakes, or to the sheets 38 and 39 prior to the flake forming operation, as a solution, for example as a water solution, or, if suitable, as a molten liquid or as a vapor. Flakes or the sheets can be passed through a water solution of aluminum chloride, and subsequently washed, if desired, e.g., with water, with dilute ammonium hydroxide, or other solution.

LUBRICATION DURING FLAKE FORMATION

As has been mentioned previously, various materials can be introduced, for example through the pipe 13 shown in Fig. 6 during formation of the glass flakes in order to lubricate the adjacent surfaces of the sheets and prevent sticking. In addition, the same or a different lubricant can be applied to the exterior surface of each sheet through the spreaders 17. Such agents, like those described above, may also be added to the slurries, applied to the flakes after formation but before introduction into the slurries, or be sprayed onto the sheets of glass where the sheets are led away separately. A particularly advantageous lubricant for such use is stannous chloride, previously discussed as a coupling agent. This salt has a melting point of about 247° C., so that it would be liquified by the hot glass sheets. Its boiling point is 623° C. so that, if desired, it could be introduced as a vapor and will, by virtue of the chemical reaction previously discussed which it undergoes with glass be effective even in such case, both as a lubricant and as a coupler. Various other lubricants can also be used, examples being estersils produced as described in U.S. Patent 2,657,149, and talc.

Where lubricants, couplers, buffers or other modifying ingredients are introduced into the interior of the balloon 15 of Fig. 6, processing is expedited if they are introduced as liquids or melted by the hot glass so that a pool thereof can be maintained inside the balloon 15 at the lower end thereof in the nip between the converging sides of the balloon 15. Normally, of course, the rollers 16 are located at such distance from the orifice 14 that the walls of the balloon are cooled to a low enough temperature so that they do not adhere to each other.

LAMINATE FILLER

Various materials can be used as the intermediate layer 30 in the laminated flake structure 31 shown in Fig. 8. Lead chloride is particularly advantageous for this use because of its relatively low melting point of 501° C., and its comparatively high specific gravity. Lead chloride can be introduced through the pipe 13 into the annular space between the two glass sheets where it is melted by heat transfer from the glass, so that a pool of lead chloride can be maintained. The depth of molten lead chloride in the pool can be controlled by regulation of the rate of addition thereof, with the result that the hydrostatic head of lead chloride acting to force the glass sheets against the rolls 16 is also varied. If desired, the spacing between the rolls 16 can also be controlled to vary the thickness of lead chloride or other filler in the laminated flake 31. In such manner, the effective specific gravity of ultimate flakes formed from the laminated structure can be varied to produce a flake which is easily suspended in a gypsum slurry.

In addition to lead chloride, various other fillers or binders can be incorporated in a laminated structure. Examples of such fillers include powdered lead borate glass, metals such as zinc, silver chloride, borates in general, silicate glues, powdered resins, ethyl silicic acid, inorganic acid gels and organo sols of silicic acid.

MODIFIED GYPSUM SLURRIES

Bonding between a gypsum slurry and glass flakes, as is indicated previously, can also be facilitated by admixture of a limited amount of a resin, usually a synthetic resin, with such slurry. Many resins are known which bond well with glass, and which are compatible with gypsum slurries. A particularly advantageous formulation can be prepared with from 10 to 20 parts by weight of a melamine-formaldehyde resin, from 90 to 80 parts of a gypsum slurry, and from 5 to 100 parts of glass flakes previously treated with methacrylato-chromic chloride. Substantially increased adherence between the gypsum slurry and the glass flakes can also be achieved by incorporating therein from 10 to 20 percent by weight of resins other than melamine-formaldehyde which are compatible therewith, for example, phenol-formaldehyde resins, polyester resins, urea-formaldehyde resins, epoxy resins, and the like.

Various fillers, as is conventional practice, can also be incorporated in glass flake-gypsum admixtures. For example, clays, cellulose, asbestos, glass fibers, and other conventional fillers can be used, if desired.

It is advantageous in many instances to produce moldings, usually synthetic resinous moldings, in temporary molds. For example, in the dental field gypsum molds are frequently used to produce partial or full plates; the same is true in the field of product development where temporary gypsum molds are frequently made for the production of test pieces or prototypes. Because of the inherent weakness of gypsum, special techniques have been developed for producing moldings in gypsum molds. One such technique involves the production of a gypsum mold in a relatively heavy metal case, and the provision of a vent through which excess material escapes from the mold in order to prevent the development of excessive pressures.

Hardened gypsum molds produced in accordance with the invention have the requisite strength for ordinary compression moldings of many materials frequently used for such purpose. This strength is achieved without sacrifice of any of the ease of handling of ordinary gypsum for the production of molds, so such materials are particularly advantageous for use as "back up" investment materials for the production of temporary molds, a conventional investment being used to form the mold cavity, and being in turn supported by the "back up" gypsum mass according to the invention.

We claim:

1. A plaster mass comprising gypsum, a synthetic resin compatible with the gypsum, and from about 50 to 70 percent by weight of flakes of glass, said flakes lying substantially parallel with respect to one another within the plaster mass in overlapping layers to provide great resistance to passage of vapor, moisture, and electrical charges through the mass, said synthetic resin being from the group consisting of melamine formaldehyde, phenol formaldehyde and urea formaldehyde.

2. In a method of fabricating a reinforced cementitious body, the steps which comprise forming a slurry of a cementitious material and water, admixing laminated glass flakes with said slurry to facilitate flow of the slurry and to reinforce the cementitious body, said laminated flakes consisting of at least two thin glass platelets bonded to each other by an intermediate layer of resinous bonding material, forming the slurry and glass flake mixture into the desired body, and setting the cementitious material, said glass flakes being from about 50 to 70 percent by weight of the reinforced body, said resinous bonding material being from the group consisting of phenol formaldehyde, urea formaldehyde and melamine formaldehyde.

3. A process for forming glass reinforced cementitious bodies comprising adding glass flakes to a cementitious material and water to form a slurry that is of such a consistency that it can be poured, spread, molded, and otherwise formed into a desired body, forming a body of the slurry, and setting the cementitious material to form a glass reinforced body, said glass flakes being from about 50 to 70 percent by weight of the reinforced body.

4. A process for forming glass reinforced gypsum comprising adding glass flakes to gypsum and water to form a slurry that is of such a consistency that it can be poured, spread, molded, and otherwise formed into a desired body, forming a body of the slurry, and hydrolyzing the gypsum to form a strong glass reinforced gypsum body, said glass flakes being from about 50 to 70 percent by weight of the reinforced body.

5. A process for forming glass reinforced gypsum bodies comprising mixing glass flakes and powdered gypsum, introducing the glass flake and powdered gypsum mixture into water to form a slurry which has a consistency that allows the slurry to be poured, spread, molded, and formed into a glass-flake reinforced gypsum body, forming a body of the slurry, and hydrolyzing the gypsum to form a glass-flake reinforced gypsum body, said glass flake being 50 to 70 percent by weight of the reinforced body.

6. A process for forming glass reinforced cementitious bodies comprising mixing an aqueous slurry of a cementitious material, a synthetic resin suitable for facilitating bonding of glass flakes to the cementitious material and from 50 to 70 percent by weight of glass flakes, forming the mixture into the desired shape, and setting the cementitious material, said synthetic resin being from a group consisting of melamine formaldehyde, phenol formaldehyde and urea formaldehyde.

References Cited in the file of this patent

UNITED STATES PATENTS

| | | |
|---|---|---|
| 2,157,759 | Jollie | May 9, 1939 |
| 2,177,000 | Nash | Oct. 24, 1939 |
| 2,233,259 | Harth | Feb. 25, 1941 |
| 2,457,785 | Slayter et al. | Dec. 28, 1948 |
| 2,662,024 | Riddell | Dec. 8, 1953 |
| 2,681,863 | Croce | June 22, 1954 |
| 2,804,438 | Biefeld et al. | Aug. 27, 1957 |